United States Patent [19]

Gottlieb

[11] Patent Number: 4,851,813
[45] Date of Patent: Jul. 25, 1989

[54] COMBINATION BACK-UP LIGHT AND SOUND EMITTING DEVICE FOR AUTOMOTIVE VEHICLE

[75] Inventor: Mark Gottlieb, Washington, D.C.

[73] Assignee: Design Tech International, Inc., Washington, D.C.

[21] Appl. No.: 222,730

[22] Filed: Jul. 22, 1988

[51] Int. Cl.⁴ .............................................. B60Q 5/00
[52] U.S. Cl. .................................... 340/474; 340/463; 340/384 E; 340/326
[58] Field of Search ...................... 340/75, 88, 90, 91, 340/84, 87, 321, 384 R, 384 E, 326, 815.22; 200/51.08, 51.13

[56] References Cited

U.S. PATENT DOCUMENTS

| | | |
|---|---|---|
| 901,540 | 10/1908 | Lindsey . |
| 1,958,028 | 5/1934 | Aymar . |
| 2,632,154 | 3/1953 | Pouell .................................. 340/88 |
| 3,372,388 | 3/1968 | Sanford ................................ 340/75 |
| 4,184,102 | 1/1980 | Arai ..................................... 315/50 |

*Primary Examiner*—Donnie L. Crosland
*Attorney, Agent, or Firm*—Oblon, Spivak, McClelland, Maier & Neustadt

[57] ABSTRACT

A combination back-up light and sound emitting device for use with an automobile includes a housing having a base at one end and a socket at the other end. A light bulb is mounted in the socket of the housing and a sound emitting device is also mounted in the housing. Bayonet type connectors are formed on the base of the housing and are electrically connected to the light bulb and sound emitting device. The bayonet type connectors are used for mechanically connecting the housing to the back-up light socket of a vehicle tail light assembly, so that installation of the combination back-up light and sound emitting device can be accomplished simply by inserting the base into the back-up light socket and turning so as to secure the bayonet type connection.

7 Claims, 2 Drawing Sheets

COMBINATION BACK-UP LIGHT AND SOUND EMITTING DEVICE FOR AUTOMOTIVE VEHICLE

BACKGROUND OF THE INVENTION

1. Field of the Invention:

The present invention relates to the combination of a back-up light and sound emitting device for an automotive vehicle such as a car or truck.

2. Brief Description of the Related Art:

It is conventional for motor vehicles such as automobiles to have back-up lights which turn on automatically whenever the vehicle is shifted into reverse. It has also been known to provide an audible signal generating device operating in conjunction with the back-up light. However, such audible signal generating devices have conventionally been inconvenient and time consuming to install, since they must hook into the wiring.

No product is commercially available which combines an audio alert sound with the back-up light bulb assembly itself.

For example, in U.S. Pat. No. 1,958,028, a single housing contains both a back-up light and bulb, as well as a gong. However, it is there necessary to clamp the housing onto a supporting plate of the vehicle and, separately from this mechanical attachment, to connect the electrical leads for the light and sound generating devices.

In U.S. Pat. No. 2,632,154, an audible signal attachment is provided for a motor vehicle back-up light. However, the electrical lead for the audible signal device is separate from the electrical lead for the back-up light. Multiple connections are necessary in order to provide both electrical and mechanical connection of both the back-up light and audible signal device to the vehicle, which is inconvenient.

SUMMARY OF THE INVENTION

It is an object of the invention to provide a combination back-up light and sound emitting device for use with an automotive vehicle.

It is another object of the present invention to provide a combination back-up light and sound emitting device for use with an automotive vehicle, which can be fitted to a conventional back-up light socket of a vehicle tail light assembly, without any alterations thereof.

It is yet another object of the invention to provide a combination back-up light and sound emitting device for use with an automotive vehicle in which both the mechanical and electrical connections can be made during installation in a single operation.

These, and other, objects have been accomplished in accordance with the present invention by providing a combination back-up light and sound emitting device for use with an automotive vehicle which includes a housing, means on the housing for mounting a light bulb thereto, an electrically actuated sound emitting device mounted to the housing, means for mechanically connecting the housing to a back-up light socket of a vehicle tail light assembly, and means on the housing for electrically connecting the sound emitting device and a light bulb mounted in the housing to the means for mechanically connecting the housing to the back-up light socket.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
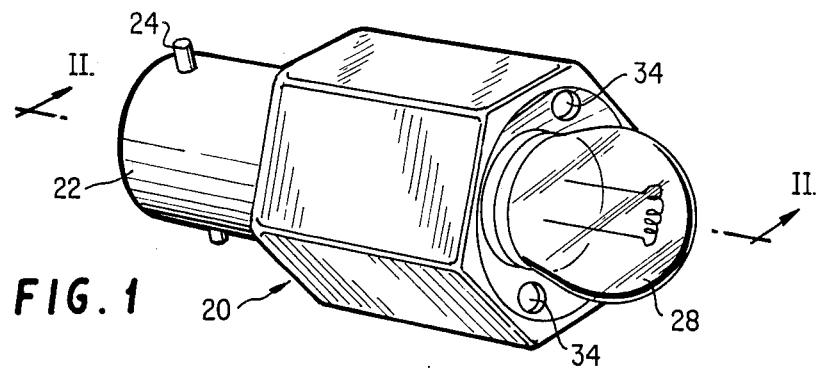
FIG. 1 is an orthogonal view of the combination back-up light and sound emitting device of the present invention.

A preferred embodiment of the present invention will now be described with reference to the accompanying FIGS., wherein the same reference numerals will be used for the same elements throughout the various views.

Figure 3:
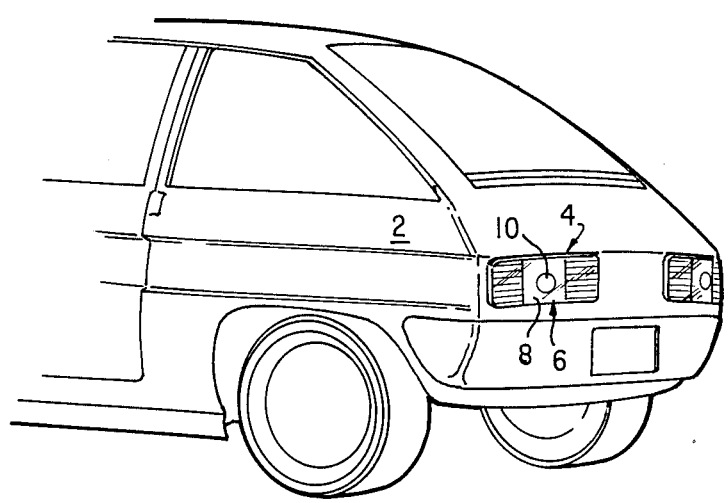
FIG. 3 shows the combination back-up light and sound emitting device of the invention installed in the back-up light socket of a vehicle tail light assembly.
Figure 4:
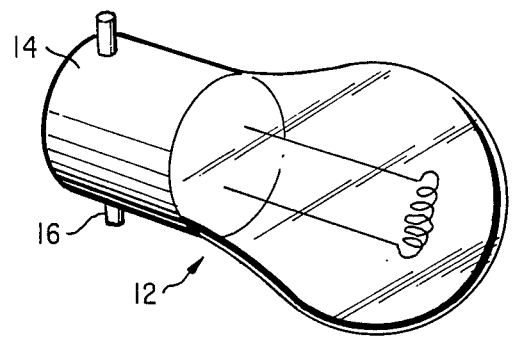
FIG. 4 shows a conventional tail light bulb.
Figure 5:
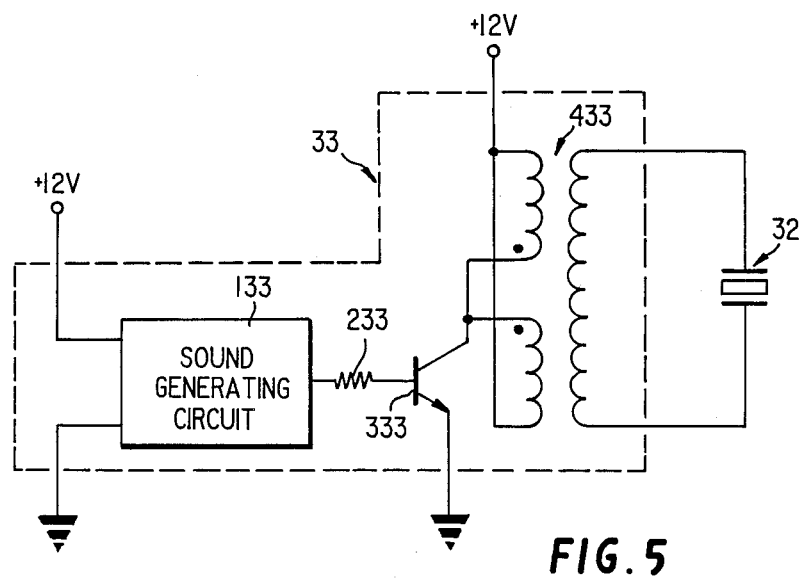
FIG. 5 shows the electronic driver circuitry.

Referring to FIG. 3, a vehicle 2 has a tail light assembly 4, including a back-up light portion 6. The back-up light portion 6 includes a reflector 8 and a socket 10 having, for example, bayonet type slot connectors for attachment of a bulb via bayonet type projections of the bulb. Conventionally, a back-up light bulb 12 (FIG. 4) has a base 14 and a pair of transverse bayonet type projections 16 which cooperate with bayonet type slots in the socket 10 for mechanically attaching the bulb to the vehicle tail light assembly. Electrical connections associated with the slots of the socket 10 provide electrical current for lighting the bulb 12 when the vehicle is shifted into reverse.

Figure 2:
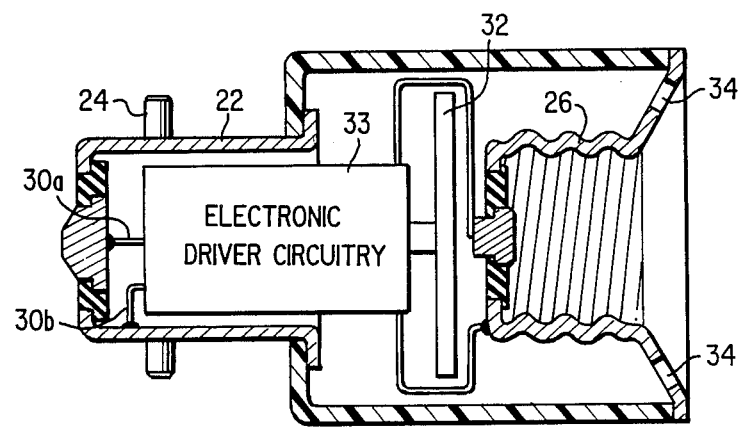
FIG. 2 is a sectional view taken along the direction of line II—II in FIG. 1.

Referring to FIGS. 1 and 2, the combination back-up light and sound emitting device of the invention includes a housing 20 which can be of any shape, but is hexagonal in section in the illustrated embodiment. The housing has a base 22 similar to the base 14 of the bulb 12, and also includes bayonet type projections 24 corresponding to the bayonet type projection 16 of the bulb 12.

At the end of the housing opposite the base, the housing supports a conductive socket 26 which accepts a smaller size of light bulb which is of equal brightness (lumens), which is readily available to the consumer. The socket 26 is electrically connected to socket 22 via wires 30a and 30b to provide electrical continuity between the back-up light socket 10 and the socket 26.

An electrically operated sound emitting device 32 is positioned within the housing 20. It is a piezotransducer consisting of a piezo electric ceramic material sandwiched between two brass discs and oriented transverse to the axis of the housing.

An electronic driver circuit includes a sound generating circuit 133 connected to the sound emitting device 32 via a 300 ohm resistor 233 and a 2N3055 type transistor 333, and via the PICO K7342 transformers 433.

Openings 34 are formed on the top of the housing to permit sound to be emitted therefrom.

In order to install the combination back-up light and sound emitting device of the present invention, the conventional back-up light bulb 12 is removed by twisting the bulb to disconnect the bayonet joint connecting the bulb to the back-up light socket 10. The combination back-up light and sound emitting device of the present invention is then installed in exactly the same way that one would install another bulb 12. That is, the base 22 is inserted in the socket 10 and the device is twisted to make the bayonet connection. Upon shifting the vehicle into reverse, electrical current will be simultaneously supplied to both the sound emitting device 32 and a bulb 12 mounted in the socket 26, so that both audible and visual back-up signals will result.

According to other variations, the bulb 28 could be permanently attached to the housing 20, so that the entire assembly could be disposed of as a unit. Of course, other types of connectors besides bayonet type connectors could be used. For example, a screw type connection could easily substitute for the illustrated bayonet type connections.

Obviously, numerous other modifications and variations of the present invention are possible in light of the above teachings. It is therefore to be understood that within the scope of the appended claims, the invention may be practiced otherwise than as specifically described herein.

What is claimed as new and derived to be secured by Letters Pat. of the U.S. is:

1. A combination back-up light and sound emitting device for use with an automotive vehicle, comprising:
   a housing;
   means on said housing for mounting a light bulb thereto;
   an electrically actuated sound emitting device mounted in said housing;
   means for mechanically connecting said housing to a back-up light socket of a vehicle tail light assembly; and
   means on said housing for electrically connecting said sound emitting device and a light bulb mounted in said housing to said means for mechanically connecting said housing to a back-up light socket of a vehicle tail light assembly, whereby the mechanical connection of said combination back-up light and sound emitting device to a back-up socket of a vehicle also provides electrical connection for both said sound emitting device and a light bulb mounted in said housing.

2. The combination back-up light and sound emitting device for use with an automotive vehicle according to claim 1 including a light bulb mounted in said housing.

3. The combination back-up light and sound emitting device for use with an automotive vehicle according to claim 1, wherein said means for mounting comprise a socket having bayonet type connectors.

4. The combination back-up light and sound emitting device for use with an automotive vehicle according to claim 1, wherein said means for mechanically connecting comprise a base having bayonet type connectors.

5. The combination back-up light and sound emitting device for use with an automotive vehicle according to claim 1 wherein said means for electrically connecting comprise electrically conductive means in said housing and connected between said sound emitting device, said means for mounting a light bulb and said means for mechanically connecting.

6. A combination back-up light and sound emitting device for use with an automotive vehicle, comprising:
   a housing having a base at one end and a socket at another end;
   a light bulb mounted in said socket of said housing;
   a sound emitting device mounted in said housing;
   bayonet type connectors formed on said base, said base and bayonet type connectors comprising means for mechanically connecting said housing to a back-up light socket of a vehicle tail light assembly; and
   means for electrically connecting said bayonet type connectors to said light bulb and said sound emitting device.

7. The combination back-up light and sound emitting device for use with an automotive vehicle according to claim 6, mounted in a back-up light socket of a vehicle tail light assembly.

* * * * *